(12) United States Patent
Chen

(10) Patent No.: US 10,578,079 B2
(45) Date of Patent: Mar. 3, 2020

(54) YAW CONTROL METHOD AND DEVICE FOR WIND GENERATOR SET

(71) Applicant: BEIJING ETECHWIN ELECTRIC CO., LTD., Beijing (CN)

(72) Inventor: Yong Chen, Beijing (CN)

(73) Assignee: BEIJING ETECHWIN ELECTRIC CO., LTD., Beijing (CN)

(*) Notice: Subject to any disclaimer, the term of this patent is extended or adjusted under 35 U.S.C. 154(b) by 122 days.

(21) Appl. No.: 15/580,172

(22) PCT Filed: Jul. 29, 2016

(86) PCT No.: PCT/CN2016/092318
§ 371 (c)(1),
(2) Date: Dec. 6, 2017

(87) PCT Pub. No.: WO2017/016518
PCT Pub. Date: Feb. 2, 2017

(65) Prior Publication Data
US 2018/0135595 A1    May 17, 2018

(30) Foreign Application Priority Data
Jul. 30, 2015  (CN) .......................... 2015 1 0459960

(51) Int. Cl.
*G05B 21/00* (2006.01)
*G05B 13/00* (2006.01)
(Continued)

(52) U.S. Cl.
CPC ........... *F03D 7/0204* (2013.01); *G05B 15/02* (2013.01); *F03D 7/048* (2013.01); *F05B 2260/80* (2013.01);
(Continued)

(58) Field of Classification Search
CPC ... G05B 15/02; F05B 2260/80; F05B 2270/20
(Continued)

(56) References Cited

U.S. PATENT DOCUMENTS

| 2011/0098975 A1 | 4/2011 | Mazzaro et al. |
| 2011/0148112 A1 | 6/2011 | Ormel et al. |

(Continued)

FOREIGN PATENT DOCUMENTS

| CN | 101971109 A | 2/2011 |
| CN | 102418661 A | 4/2012 |

(Continued)

OTHER PUBLICATIONS

International Search Report dated Nov. 3, 2016; PCT/CN2016/092318.
(Continued)

*Primary Examiner* — Md Azad

(57) ABSTRACT

Provided are a yawing control method and a yawing control device for a wind turbine. The yawing control method includes: acquiring first wind information at a current moment characterized by current operation data of a neighbor wind turbine adjacent to the wind turbine when at least one of a wind direction sensor and a wind direction data uploading path of the wind turbine fails; acquiring second wind information matched with the first wind information in wind information characterized by historical operation data of the wind turbine at all moments; and performing yawing control on the wind turbine based on the second wind information.

18 Claims, 4 Drawing Sheets

(51) Int. Cl.
  *G05B 15/00* (2006.01)
  *G01M 1/38* (2006.01)
  *G05D 23/00* (2006.01)
  *F03D 7/02* (2006.01)
  *G05B 15/02* (2006.01)
  *F03D 7/04* (2006.01)

(52) U.S. Cl.
  CPC ....... *F05B 2270/20* (2013.01); *F05B 2270/32* (2013.01); *F05B 2270/321* (2013.01); *F05B 2270/329* (2013.01); *F05B 2270/335* (2013.01)

(58) Field of Classification Search
  USPC ........................................................ 700/279
  See application file for complete search history.

(56) References Cited

U.S. PATENT DOCUMENTS

| | | | |
|---|---|---|---|
| 2011/0187106 A1 | 8/2011 | Ichinose et al. | |
| 2011/0193344 A1 | 8/2011 | Lafferty et al. | |
| 2011/0213590 A1* | 9/2011 | Middendorf | F03D 7/042 702/184 |
| 2013/0110414 A1 | 5/2013 | Caponetti et al. | |
| 2013/0214535 A1* | 8/2013 | Brath | F03D 7/0264 290/44 |
| 2013/0259686 A1* | 10/2013 | Blom | F03D 7/0276 416/1 |
| 2014/0239639 A1 | 8/2014 | Bai et al. | |
| 2014/0239640 A1 | 8/2014 | Li | |
| 2016/0034856 A1* | 2/2016 | Son | G06Q 10/20 705/7.18 |
| 2017/0241409 A1* | 8/2017 | Kjær | G01P 13/02 |

FOREIGN PATENT DOCUMENTS

| | | |
|---|---|---|
| CN | 102434392 A | 5/2012 |
| CN | 102454546 A | 5/2012 |
| CN | 102619684 A | 8/2012 |
| CN | 102619687 A | 8/2012 |
| CN | 103717885 A | 4/2014 |
| CN | 104018986 A | 9/2014 |
| CN | 105041570 A | 11/2015 |
| EP | 2447722 A1 | 5/2012 |
| EP | 2631471 A1 | 8/2013 |
| KR | 20120083212 A | 7/2012 |

OTHER PUBLICATIONS

Extended European Search Report dated Feb. 25, 2019; Appln. No. 16829883.4.
The First Korean Office Action dated Apr. 15, 2019; Appln. No. 10-2017-7036794.

* cited by examiner

YAW CONTROL METHOD AND DEVICE FOR WIND GENERATOR SET

CROSS-REFERENCE TO RELATED APPLICATIONS

This application is a National Stage application of PCT international patent application PCT/CN2016/092318, filed on Jul. 29, 2016 which claims priority to Chinese Patent Application No. 201510459960.9, titled "YAW CONTROL METHOD AND DEVICE FOR WIND TURBINE GENERATOR SYSTEM", filed with the Chinese Patent Office on Jul. 30, 2015, both of which are incorporated herein by reference in their entireties.

FIELD

The present disclosure relates to the technical field of wind power, and in particular to a yawing control method and a yawing control device for a wind turbine.

BACKGROUND

With a rapid development of the wind power technology, wind farms in various environments are developed. Failures may be occurred in a wind turbine generator system (referred to as "wind turbine" for short) under a bad weather condition such as frosty and wind. In particular to a wind direction sensor of the wind turbine, extreme weather or prolonged operation will cause the wind direction sensor to fail.

Once the wind direction sensor fails, those skilled in the art are required to repair or replace the wind direction sensor in a better weather condition. Before the wind direction sensor is repaired or replaced, the wind turbine may not yaw to align wind to obtain the maximum wind power, even the wind turbine stops operating, thereby extremely affecting a utilization rate and a power-generating capacity of the wind turbine.

SUMMARY

According to embodiments of the present disclosure, a yawing control method and a yawing control device for a wind turbine are provided, to perform wind alignment yawing control on the wind turbine when the wind direction sensor fails, thereby improving a power-generating capacity and a utilization rate of the wind turbine.

In order to achieve the above object, according to an embodiment of the present disclosure, a yawing control method for a wind turbine is provided, which includes:

acquiring first wind information at a current moment characterized by current operation data of a neighbor wind turbine adjacent to the wind turbine when at least one of a wind direction sensor and a wind direction data uploading path of the wind turbine fails;

acquiring second wind information matched with the first wind information in wind information characterized by historical operation data of the wind turbine at all moments; and performing yawing control on the wind turbine based on the second wind information.

According to an embodiment of the present disclosure, a yawing control device for a wind turbine is provided, which includes:

a first wind information acquiring unit, configured to acquire first wind information at a current moment characterized by current operation data of a neighbor wind turbine adjacent to the wind turbine when at least one of a wind direction sensor and a wind direction data uploading path of the wind turbine fails;

a second wind information acquiring unit, configured to acquire second wind information matched with the first wind information in wind information characterized by historical operation data of the wind turbine at all moments; and a yawing control unit, configured to perform yawing control on the wind turbine based on the second wind information.

With the yawing control method and the yawing control device for the wind turbine according to the embodiments of the present disclosure, when the wind direction sensor and/or the wind direction data uploading path of the wind turbine fails, the first wind information characterized by the current operation data of the neighbor wind turbine is acquired, the second wind information matched with the first wind information in the wind information characterized by the historical operation data of the wind turbine is acquired, and yawing control is performed on the wind turbine based on the second wind information, thereby ensuring normal operation of the wind turbine and effectively increasing the utilization rate and the power-generating capacity of the wind turbine.

DESCRIPTION OF REFERENCE NUMBERS

401—first wind information acquiring unit, 402—second wind information acquiring unit, 4021—historical moment acquiring subunit, 4022—second wind information acquiring subunit, 403—yawing control unit, 4031—detection angle determining subunit, 4032—yawing control subunit, 404—angle acquiring unit, 405—wind direction sensor faulty detecting unit.

DETAILED DESCRIPTION OF EMBODIMENTS

According to the embodiments of the present disclosure, the first wind information characterized by the current operation data of the neighbor wind turbine adjacent to the wind turbine is acquired, the second wind information matched with the first wind information in the wind information characterized by the historical operation data of the wind turbine is acquired, and wind alignment yawing control is performed on the wind turbine based on the second wind information. The technical scheme of the embodiments of the present disclosure may be applied to wind alignment yawing control in various cases that the wind turbine cannot acquire the wind direction information normally. Particularly, there are many cases where the wind direction information cannot be obtained normally, for example, a case that a wind direction sensor fails and a wind direction data uploading path fails. The wind direction data uploading path failing includes multiple cases, for example, a case that the uploading path fails and a case that an interface for receiving the wind direction data in an executive subject for performing the yawing control method for the wind turbine according to the present disclosure fails. The wind direction data may be understood as multiple types of data used for determining the wind direction, including but not being limited to sensing data of the wind direction sensor. The following embodiments are described by taking the case that the wind direction sensor fails as an example, which should not be understood as a limitation.

First Embodiment

Figure 1:
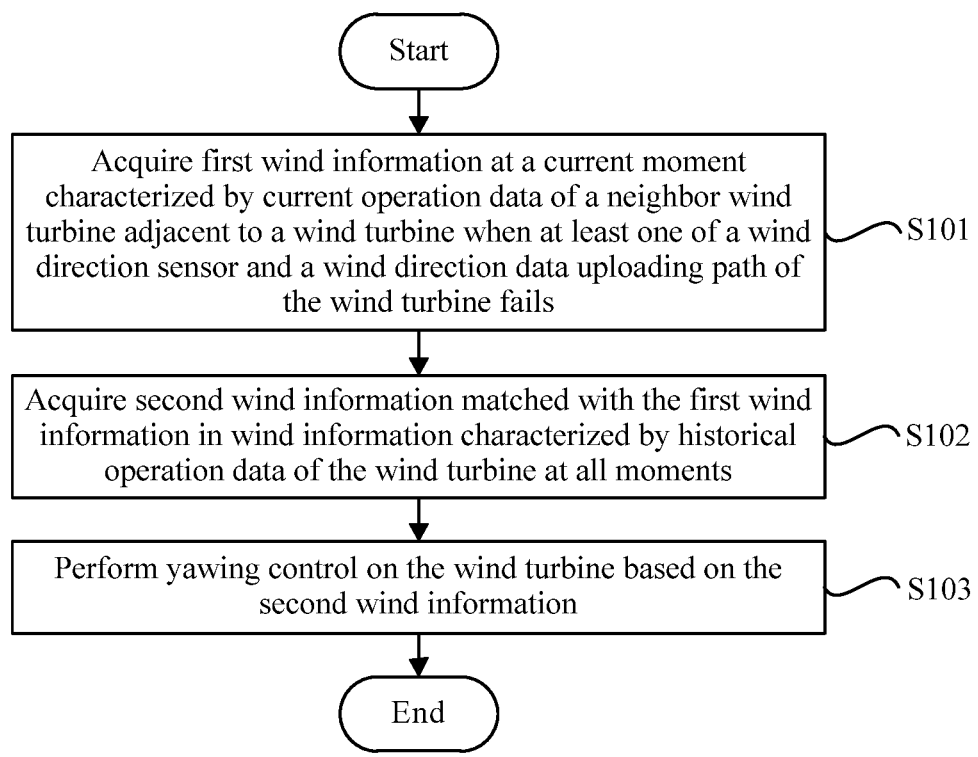
FIG. 1 is a flowchart of a yawing control method for a wind turbine according to a first embodiment of the present disclosure.

FIG. 1 is a flowchart of a yawing control method for a wind turbine according to a first embodiment of the present disclosure. An executive subject of the method may be an integrated control device, such as a group control system, used for controlling operation states of wind turbines in a wind farm. Referring to FIG. 1, the yawing control method for the wind turbine includes S101 to S103.

In S101, first wind information at a current moment characterized by current operation data of a neighbor wind turbine adjacent to a wind turbine is acquired when at least one of a wind direction sensor and a wind direction data uploading path of the wind turbine fails.

In this embodiment, generally, in the wind farm, the adjacent wind turbines are in similar wind environments, which include a wind speed and a wind direction or the like. The wind environment information of the location of the wind turbine can be calculated based on the operation data of the wind turbine, especially the data related to the yawing control. The data related to the yawing control is, such as, a wind turbine yawing position, a wind direction detected by the wind direction sensor, a wind speed detected by a wind speed detection device, an angle position when the wind turbine is not in a yawing operation state. Based on this feature, when the wind direction sensor of the wind turbine fails, the wind environment when the wind turbine fails is recovered by utilizing the wind environment fed back by operation parameters of the neighbor wind turbine, thereby achieving a yawing operation on the wind turbine.

When any one or both of the following cases occurring, the cases including a case that the wind direction sensor of a wind turbine in the wind farm fails and a case that the wind direction data uploading path fails, current operation data of a neighbor wind turbine adjacent to the wind turbine may be extracted and the first wind information at the current moment characterized by the operation data may be acquired through analyzing and calculating the data. The first wind information includes wind speed information and wind direction information of the wind environment where the neighbor wind turbine is located.

In specific application scene, a wind turbine which is adjacent to the faulty wind turbine or is closest to the faulty wind turbine may be selected as the above neighbor wind turbine.

In S102, second wind information matched with the first wind information in wind information characterized by historical operation data of the wind turbine at all moments is acquired.

Figure 2:
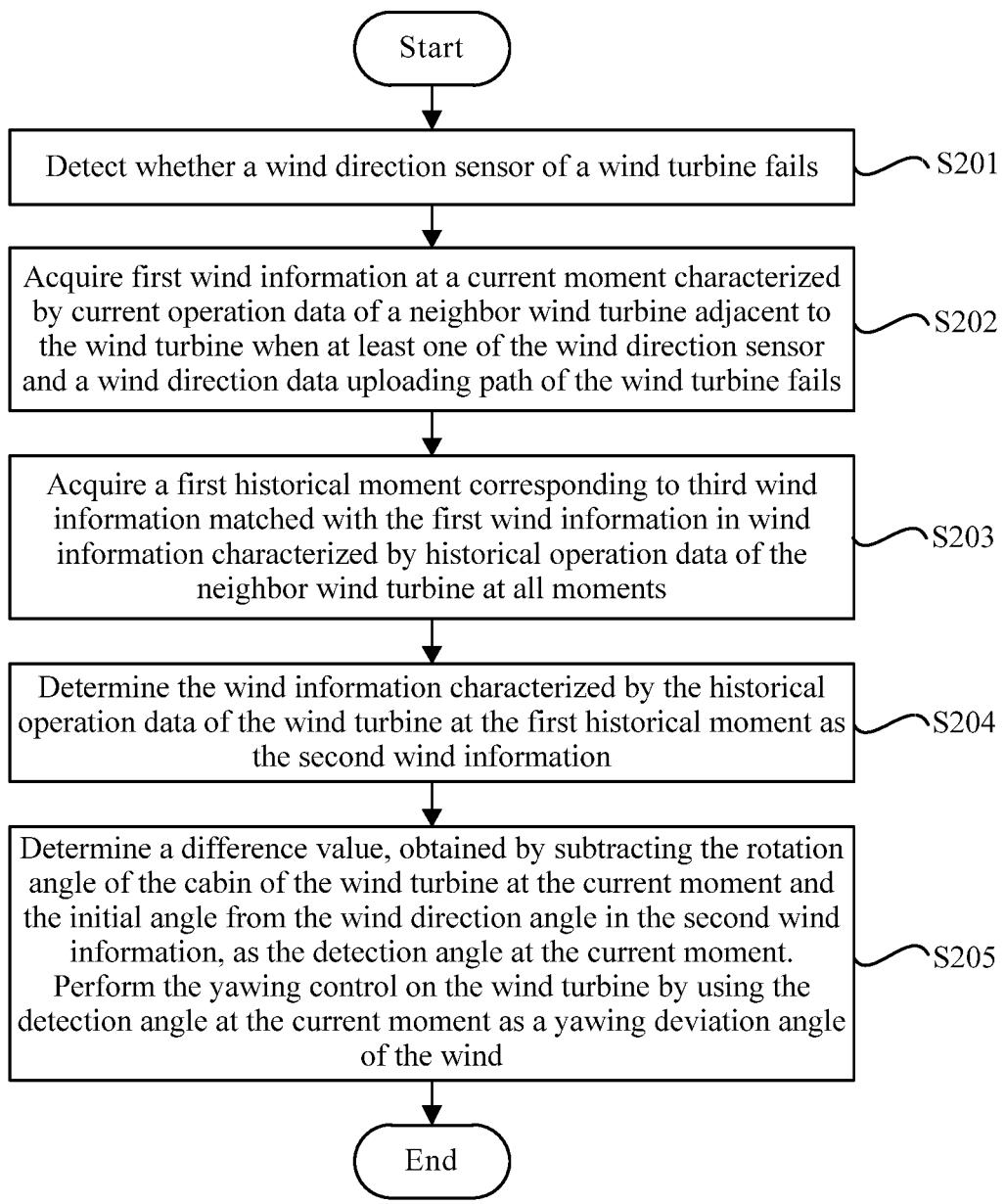
FIG. 2 is a flowchart of a yawing control method for a wind turbine according to a second embodiment of the present disclosure.

In the present embodiment, after acquiring the first wind information of the neighbor wind turbine, the historical operation data of the wind turbine with the faulty wind direction sensor at all moments may be extracted, and the corresponding wind information is calculated through the operation data. Similarity matching is performed on the wind information and the first wind information, to find the wind information most similar to the first wind information as the second wind information, and then the second wind information matched with the first wind information is determined. The matching is explained by taking the similarity matching as an example, which is not understood as a limitation, for example, the correlation matching in the embodiment shown in FIG. 2 is further included.

Preferably, in particular application scene, the wind information most similar to the first wind information in the wind information may be selected as the second wind information.

In S103, yawing control is performed on the wind turbine based on the second wind information.

In the embodiment, in particular, the acquired second wind information may be regarded as the wind environment information most similar to the actual case characterized by the operation data of the wind turbine when the wind turbine fails.

It may be understood that the executive subject of S101 to S103 may be a faulty wind turbine or a group control system for centrally controlling the wind turbines. In a case that each wind turbine stores its own current and historical operation data, if the executive subject of S101 to S103 is the faulty wind turbine, the operation data of the neighbor wind turbine needs to be extracted from the neighbor wind turbine by the faulty wind turbine in S101, if the executive subject of S101 to S103 is the group control system, the corresponding operation data needs to be extracted from the neighbor wind turbine and the faulty wind turbine respectively by the group control system in S101 and S102. In a case that the operation data of each wind turbine is stored in the group control system, and the executive subject of S101 to S103 is the group control system, the operation data may be extracted directly from the group control system in S101 to S103. The above explanation is applicable to the embodiments of the present disclosure.

With the yawing control method for the wind turbine according to the embodiments of the present disclosure, when at least one of a wind direction sensor and a wind direction data uploading path of the wind turbine fails, first wind information characterized by current operation data of a neighbor wind turbine is acquired, second wind information matched with the first wind information in wind information characterized by historical operation data of the wind turbine is acquired, and the second wind information is regarded as the wind information of the wind turbine when the wind turbine fails, and yawing control is performed on the wind turbine. With the method, yawing control is performed on the wind turbine when the wind direction sensor fails, thereby ensuring the normal operation of the wind turbine and effectively increasing the utilization rate and the power-generating capacity of the wind turbine.

Second Embodiment

FIG. 2 is a flowchart of a yawing control method for a wind turbine according to a second embodiment of the present disclosure. Referring to FIG. 2, before S101, the yawing control method for the wind turbine further includes S201. In S201, it is detected whether a wind direction sensor of the wind turbine fails.

S201 includes: determining that the wind direction sensor of the wind turbine fails in a case that a detection angle of the wind direction sensor does not change during a successive period greater than a setting time threshold; or determining that the wind direction sensor of the wind turbine fails in a case that a detected wind speed of the wind turbine is greater than a setting wind speed and an output power of the wind turbine is less than a preset percent of a setting power.

In the embodiments of the present disclosure, in particular, in order to accurately and timely detect failure of the wind direction sensor of a wind turbine, it is detected whether the wind direction sensor fails through following two manners. In one manner, a wind speed detected by each wind turbine and an output power of the wind turbine are extracted, it is determined that the wind direction sensor of the wind turbine fails in a case that a detection angle of the wind direction sensor does not change during a successive period greater than a setting time threshold. For example, the time threshold may be set as different values according to different wind speeds. For example, in a case that the wind speed is not greater than 5 m/s, the time threshold is set as 90 s; and in a case that the wind speed is greater than 5 m/s, the time threshold is set as 30 s. Alternatively, in the other manner, it is determined that the wind direction sensor of the wind turbine fails in a case that a wind speed is greater than a setting wind speed and an output power of the wind turbine is less than a preset percent of a setting power, the setting wind speed may be set as 5 m/s, and the preset percent may be set as 50 percent.

It may be understood that the executive subject of S201 may be a faulty wind turbine or a group control system for centrally controlling each wind turbine. In a case that each wind turbine stores its own current and historical operation data, if the executive subject of S201 is the faulty wind turbine, there is no need to extract the wind speed detected by the wind turbine and the output power of the wind turbine from different wind turbines. In a case that the operation data of each wind turbine is stored in the group control system, and the executive subject of S201 is the group control system, there is also no need to extract the wind speed detected by the wind turbine and the output power of the wind turbine from different wind turbines. The above explanation is applicable to the embodiments of the present disclosure.

In S202, first wind information at a current moment characterized by current operation data of a neighbor wind turbine adjacent to a wind turbine is acquired when at least one of a wind direction sensor and a wind direction data uploading path of the wind turbine fails. The neighbor wind turbine is adjacent to the wind turbine and an environmental wind speed currently detected by the neighbor wind turbine is greater than a predetermined wind speed threshold. The execution procedure of S202 may be referred to corresponding content of S101 in the first embodiment.

In the embodiments, when the wind direction sensor of the wind turbine fails and/or the wind data uploading path fails, a historical moment corresponding to the historical wind environment matched with the current wind environment is searched from the historical wind environment fed back by the historical operation data of the neighbor wind turbine by utilizing the current wind environment fed back by the current operation data of the neighbor wind turbine, and a historical wind environment fed back by the current operation data of faulty wind turbine at the historical moment is acquired, and the historical wind environment is used to recover the wind environment where the wind turbine is located when the wind turbine fails, thereby realizing yawing on the wind turbine.

In order to ensure the reliability and stability of the operation data of neighbor wind turbine, when the current operating data of one neighbor wind turbine adjacent to the wind turbine is selected, a wind turbine with a currently detected wind speed greater than a predetermined wind speed threshold may be selected from multiple neighbor wind turbines as the one selected neighbor wind turbine, where the predetermined wind speed threshold may be set as 5 m/s.

In the present embodiment, the matching in 102 may be understood as correlation matching, specifically including S203 to S204.

In S203, a first historical moment corresponding to third wind information matched with the first wind information in wind information characterized by historical operation data of the neighbor wind turbine at all moments is acquired.

In the embodiment, after acquiring the first wind information of the neighbor wind turbine, the historical operation data of the neighbor wind turbine at all moments is extracted, and corresponding wind information is calculated through these historical operation data, then similarity matching is performed on these wind information and the first wind information, thereby finding the wind information most similar to the first wind information as the third wind information. Finally, the historical moment in the historical operation data corresponding to the third wind information is determined as the first historical moment.

Optionally, in a case that the third wind information includes multiple sets of data, the wind information at a moment closest to the current moment may be selected as the third wind information.

In S204, the wind information characterized by the historical operation data of the wind turbine at the first historical moment is determined as the second wind information. In this embodiment, the first wind information and the third wind information are matched in similarity, the third wind information and the second wind information correspond to a same moment, therefore there is correlation between the first wind information and the second wind information, which may be understood as correlation matching.

In the embodiment, after acquiring the first historical moment, the historical operation data of the wind turbine at the first historical moment is extracted. The wind direction sensor of the wind turbine does not fail at the first historical moment, thus the historical operation data includes the wind direction information detected by the wind direction sensor, and the wind information characterized by the wind direction detected by the wind direction sensor and the wind speed detected by the wind speed detection device in the historical operation data is determined as the second wind information.

In the specific application scene, contents of S203 to S204 may be described through following embodiments.

All the wind information related above mainly includes the wind speed information and the wind direction information, and the wind speed information may be obtained by extracting the historical operation data, and the wind direction information may be obtained through a1 to a2.

In a1, an initial angle of a cabin in a case of the wind turbine being not in a yawing operation state, a rotation angle of the cabin of the wind turbine at the current moment and a detection angle of the wind direction sensor of the wind turbine at the current moment are acquired.

In a2, a sum of the initial angle of the cabin in a case of the wind turbine being not in the yawing operation state, the rotation angle of the cabin of the wind turbine at the current moment and the detection angle of the wind direction sensor of the wind turbine at the current moment is determined as a wind direction angle in the wind information at the current moment.

The initial angle of the cabin refers to the angle between the cabin axis and the setting reference direction when the installation of the wind turbine completes and the wind turbine is not in the yawing operation state and the cabin axis does not rotate with respect to a tower. The cabin axis in the present embodiment may be vertical to the wind turbine plane. The rotation angle of cabin refers to the angle between the cabin axis when the cabin is not rotated and the cabin axis without yawing. The detection angle of the wind direction sensor refers to the angle between the detected actual wind direction and the current cabin axis. Therefore, 0° angle direction is taken as a reference direction, the actual wind direction angle in the wind information at the current moment should be the sum of the initial angle, the rotation angle at the current moment and the detection angle of the wind direction sensor.

Figure 3:
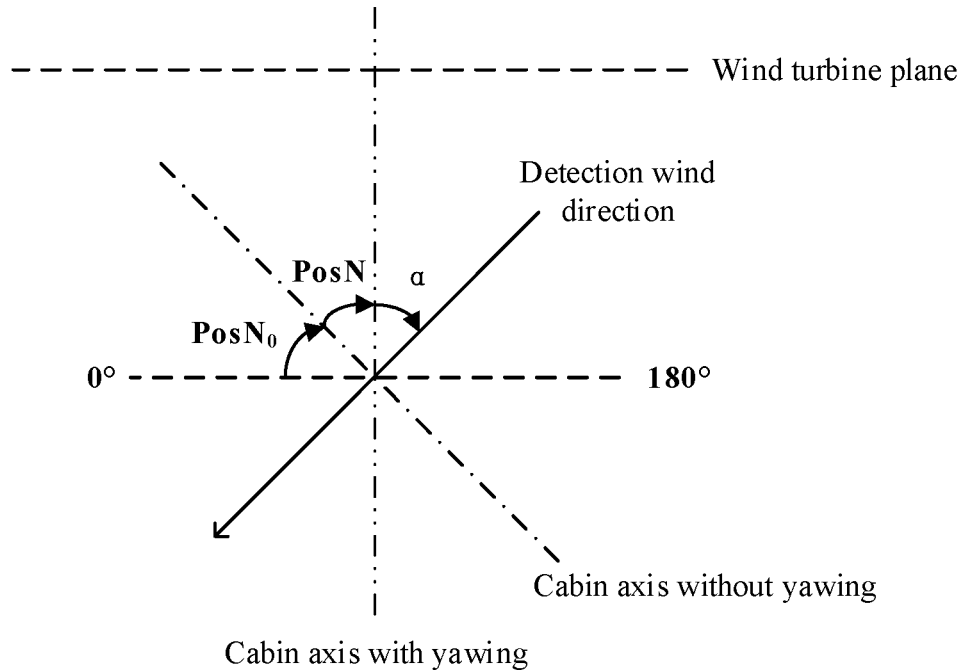
FIG. 3 is an example diagram of detection of a yawing position of a cabin of a wind turbine in a yawing control method for a wind turbine according to the second embodiment of the present disclosure.

For describing the acquisition of the above parameters, reference is made to FIG. 3 which is an example diagram of detection of a yawing position of a cabin of a wind turbine in a yawing control method for a wind turbine according to the second embodiment of the present disclosure. As shown in FIG. 3, the reference direction should be set firstly. In FIG. 3, 0° angle direction is set as the reference direction, and clockwise is positive. The initial angle refers to the angle between the cabin axis and the reference direction when the wind turbine is not in the yawing operation state, the initial angle is represented as $PosN_0$. The rotation angle refers to the angle between the cabin axis with yawing and the cabin axis without yawing, the rotation angle is represented as PosN. The detection angle of the wind direction sensor refers to the angle between the detection wind direction and the cabin axis with yawing, the detection angle of the wind direction sensor is represented as a. The wind direction may be represented as Wd, then, $Wd=PosN_0+PosN+\alpha$. For example, the due north direction is set as the reference direction, the angle of the clockwise rotation of the cabin is set to be positive, the angle of anticlockwise rotation is set to be negative, when the cabin rotates clockwise for 90 degrees, the new rotation angle is PosN+90. The $PosN_0$ is 0 when the cabin without yawing faces the due north direction. PosN is 0 when the cabin in the rotation state at some moment faces the due north direction. If the detection angle α of the wind detection sensor at the moment is 0, the wind direction at the moment Wd is 0. The wind direction Wd ranges from 0 to 360 degrees, and if the wind direction Wd is greater than 360 degrees, 360 degrees is subtracted from the wind direction Wd, that is, a modulo operation is performed at 360 degrees.

In particular, in a case that the wind direction information of the first wind information is represented as Wd1, the wind speed is represented as X1, thus the wind information in which the wind direction and the wind speed are most closest to Wd1 and X1 respectively is found from the wind information calculated based on the historical operation data of the neighbor wind turbine at all moments as the third wind information. The first historical moment corresponding to the third wind information is obtained. The wind direction and the wind speed in the wind information corresponding to the historical operation data of the wind turbine at the first historical moment are obtained, which are represented as Wd0 and X0 respectively, in this case, the wind direction and the wind speed in the second wind information are Wd0 and X0 respectively.

In S205, a difference value, obtained by subtracting the rotation angle of the cabin of the wind turbine at the current moment and the initial angle from the wind direction angle in the second wind information is determined as the detection angle at the current moment. The yawing control is performed on the wind turbine by using the detection angle at the current moment as a yawing deviation angle of the wind.

For example, in the above example, the yawing control is performed on the wind turbine by using the detection angle α as the yawing deviation angle of the wind.

The yawing control method for the wind turbine adopted in the embodiment provides the specific implementation of determining the second wind information and determining whether the wind turbine faults. When the wind direction sensor fails, the second wind information of the wind turbine matched with the first wind information of the neighbor wind turbine is acquired based on the first wind information, and the wind alignment yawing control is performed on the wind turbine based on the second wind information, thereby ensuring the normal operation of wind turbine and effectively increasing the utilization rate and the power-generating capacity of the wind turbine without increasing hardware cost.

What are described above are only specific embodiments of the present disclosure. However, the scope of protection of the present disclosure is not limited thereto. Any changes or equivalent substitutions made easily by any of those skilled in the art within the technical scope disclosed in the present disclosure fall within the scope of protection of the present disclosure. Therefore, the scope of protection of the present disclosure should consistent with the scope of protection of the claims.

Third Embodiment

Figure 4:
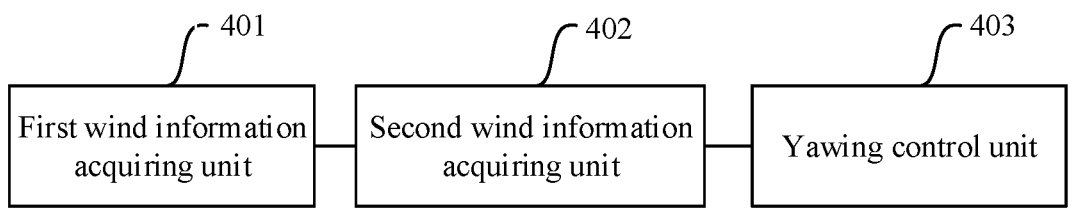
FIG. 4 is a schematic structural diagram of a yawing control device for a wind turbine according to a third embodiment of the present disclosure.

FIG. 4 is a schematic structural diagram of a yawing control device for a wind turbine according to a third embodiment of the present disclosure, which may be used to execute operations of the method of the embodiment shown in FIG. 1, and the explanation for FIG. 1 may be applied to the third embodiment. As shown in FIG. 4, the yawing control device for the wind turbine includes a first wind information acquiring unit 401, a second wind information acquiring unit 402 and a yawing control unit 403.

The first wind information acquiring unit 401 is configured to acquire first wind information at a current moment characterized by current operation data of a neighbor wind turbine adjacent to the wind turbine when at least one of a wind direction sensor and a wind direction data uploading path of the wind turbine fails.

The second wind information acquiring unit 402 is configured to acquire second wind information matched with the first wind information in wind information characterized by historical operation data of the wind turbine at all moments.

The yawing control unit 403 is configured to perform yawing control on the wind turbine based on the second wind information.

Referring to explanation for FIG. 1, it may be understood that the first wind information acquiring unit 401, the second wind information acquiring unit 402 and the yawing control unit 403 may be integrated in a faulty wind turbine or may be integrated in a group control system, such as a wind farm controller, for centrally controlling each wind turbine. In a case that they are integrated in the group control system, and the group control system stores the operation data of each wind turbine, there is no need for the first wind information acquiring unit 401 and the second wind information acquiring unit 402 to extract the operation data from different wind turbines.

The yawing control device for the wind turbine of the present embodiment may be used to implement the yawing control method for the wind turbine provided by the first embodiment of the disclosure, and the principle of the yawing control device is similar to that of the yawing control method, which is not described herein.

With the yawing control device for the wind turbine according to the embodiments of the present disclosure, when at least one of a wind direction sensor and a wind direction data uploading path of the wind turbine fails, first wind information characterized by current operation data of a neighbor wind turbine is acquired, second wind information matched with the first wind information in wind information characterized by historical operation data of the wind turbine is acquired, and the second wind information is regarded as the normal wind information detected by the wind direction sensor when the wind turbine fails, and wind alignment yawing control is performed on the wind turbine. With the method, yawing control is performed on the wind turbine when the wind direction sensor fails, thereby ensuring the normal operation of the wind turbine and effectively increasing the utilization rate and the power-generating capacity of the wind turbine.

Forth Embodiment

Figure 5:
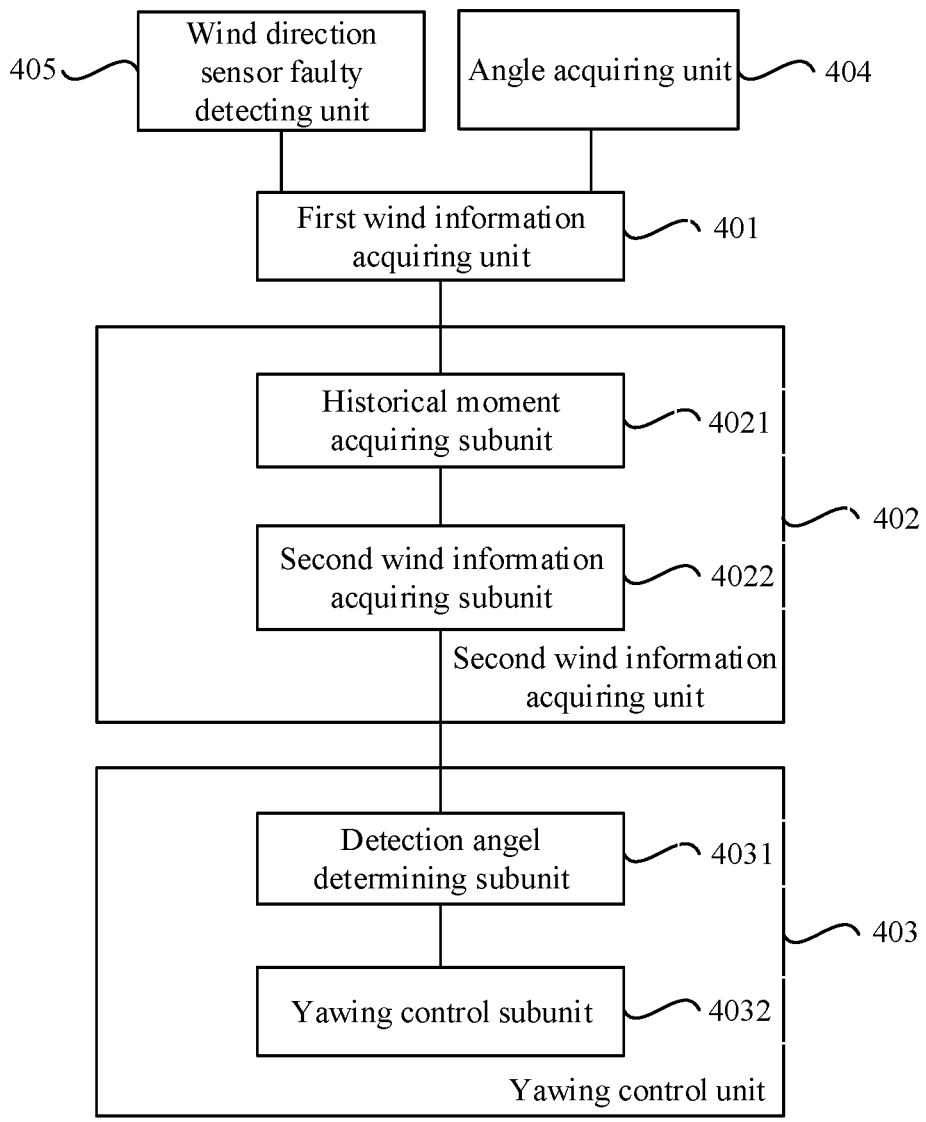
FIG. 5 is a schematic structural diagram of a yawing control device for a wind turbine according to a fourth embodiment of the present disclosure.

FIG. 5 is a schematic structural diagram of a yawing control device for a wind turbine according to a fourth embodiment of the present disclosure, which may be used to execute operations of the method of the embodiment shown in FIG. 2, and the explanation for FIG. 2 may be applied to the fourth embodiment. As shown in FIG. 5, the yawing control device for the wind turbine is described as follows. The second wind information acquiring unit 402 includes a historical moment acquiring subunit 4021 and a second wind information acquiring subunit 4022.

The historical moment acquiring subunit 4021 is configured to acquire a first historical moment corresponding to third wind information matched with the first wind information in wind information characterized by historical operation data of the neighbor wind turbine at all moments.

The second wind information acquiring subunit 4022 is configured to determine the wind information characterized by the historical operation data of the wind turbine at the first historical moment as the second wind information.

In addition, the wind information includes wind direction information and wind speed information. Correspondingly, the yawing control device for the wind turbine further includes an angle acquiring unit 404 and a wind direction sensor faulty detecting unit 405.

The angle acquiring unit 404 is configured to: acquire an initial angle of a cabin in a case of the wind turbine being not in a yawing operation state, a rotation angle of the cabin of the wind turbine at the current moment and a detection angle of the wind direction sensor of the wind turbine at the current moment; and calculate a sum of the initial angle, the rotation angle and the detection angle as a wind direction angle in the wind information at the current moment.

The angle acquiring unit 404 defines that the wind direction angle of each wind turbine at each moment is the sum of the initial angle of the cabin in a case of the wind turbine being not in the yawing operation state, the rotation angle of the cabin of the wind turbine at the current moment and the detection angle of the wind direction sensor of the wind turbine at the current moment. In addition, the function of the yawing control unit 403 may be further defined in detail, the yawing control unit 403 includes a detection angel determining subunit 4031 and a yawing control subunit 4032.

The detection angel determining subunit 4031 is configured to determine a difference value, obtained by subtracting the rotation angle of the cabin of the wind turbine at the current moment and the initial angle from the wind direction angle in the second wind information, as the detection angle at the current moment.

The yawing control subunit 4032 is configured to perform the yawing control on the wind turbine by using the detection angle at the current moment as a yawing deviation angle of the wind.

Preferably, the yawing control device for the wind turbine further includes a wind direction sensor faulty detecting unit 405, connected to the first wind information acquiring unit and configured to determine that the wind direction sensor of the wind turbine fails in a case that a detection angle of the wind direction sensor does not change during a successive period greater than a setting time threshold; or determine that the wind direction sensor of the wind turbine fails in a case that a detected wind speed of the wind turbine is greater than a setting wind speed and an output power of the wind turbine is less than a preset percent of a setting power.

It may be understood the wind direction sensor faulty detecting unit 405 may be integrated in a faulty wind turbine or may be integrated in a group control system for centrally controlling each wind turbine. In a case that each wind turbine stores its own current and historical operation data, if the wind direction sensor faulty detecting unit 405 is integrated in the faulty wind turbine, there is no need to extract the wind speed detected by the wind turbine and the output power of the wind turbine from different wind turbines. In a case that the operation data of each wind turbine is stored in the group control system and the wind direction sensor faulty detecting unit 405 is integrated in the group control system for controlling wind turbines, there is also no need to extract the wind speed detected by the wind turbine and the output power of the wind turbine from different wind turbines. The above explanation is applicable to the embodiments of the present disclosure.

Furthermore, the first wind information acquiring unit 401 may be further configured to extract the current operation data of a neighbor wind turbine adjacent to the wind turbine and an environmental wind speed currently detected by which is greater than a predetermined wind speed threshold.

The yawing control device for the wind turbine may be arranged in the controller of the wind turbine or be arranged in a wind farm controller for centrally controlling each wind turbine.

The yawing control device for the wind turbine of the present embodiment may be used to implement the yawing control method for the wind turbine provided by the second embodiment of the disclosure, and the principle of the yawing control device is similar to that of the yawing control method, which is not described herein.

The yawing control device for the wind turbine adopted in the embodiment provides the specific implementation of determining the second wind information and determining whether the wind turbine faults on the basis of the embodiment shown in FIG. 4. When the wind direction sensor fails, the second wind information of the wind turbine matched with the first wind information of the neighbor wind turbine is acquired based on the first wind information, and the wind alignment yawing control is performed on the wind turbine based on the second wind information, thereby ensuring the normal operation of wind turbine and effectively increasing the utilization rate and the power-generating capacity of the wind turbine without increasing hardware cost.

It should be noted that, the above embodiments are only intended for describing the technical solutions of the present disclosure, and should not be interpreted as limitation to the present disclosure. Although the present disclosure is described in detail in conjunction with the above embodiments, it should be understood that, for those skilled in the art, modifications may be made to the technical solutions of the above embodiments, or equivalent substitutions may be made to part or all of the technical features in the technical solutions; and these modifications and substitutions do not cause the technical solutions to depart from the scope of technical solutions according to embodiments of the disclosure.

The invention claimed is:

1. A yawing control method for a wind turbine, comprising:
   acquiring first wind information at a current moment characterized by current operation data of a neighbor wind turbine adjacent to the wind turbine when at least one of a wind direction sensor and a wind direction data uploading path of the wind turbine fails;
   acquiring historical operation data of the neighbor wind turbine at corresponding moments and a plurality of wind information characterized by the historical operation data of the neighbor wind turbine at the corresponding moments, wherein the first wind information and each of the plurality of wind information characterized by the historical operation data of the neighbor wind turbine at the corresponding moments both comprise information about wind speed and wind direction;
   performing similarity matching on the wind information characterized by the historical operation data of the neighbor wind turbine at the corresponding moments and the first wind information, to find a third wind information from the plurality of wind information characterized by the historical operation data of the neighbor wind turbine at the corresponding moments, wherein wind speed and wind direction comprised in the third wind information are respectively most similar to wind speed and wind direction comprised in the first wind information;
   determining, as a first historical moment, which moment of the corresponding moments the third wind information corresponds to;
   acquiring historical operation data of the wind turbine at the first historical moment;
   determining wind information characterized by the historical operation data of the wind turbine at the first historical moment as a second wind information; and
   performing yawing control on the wind turbine based on the second wind information.

2. The method according to claim 1, wherein the wind information comprises a wind direction and a wind speed; and a wind direction angle of the wind turbine at the current moment is a sum of an initial angle of a cabin in a case of the wind turbine being not in a yawing operation state, a rotation angle of the cabin of the wind turbine at the current moment and a detection angle of the wind direction sensor of the wind turbine at the current moment.

3. The method according to claim 2, wherein the performing yawing control on the wind turbine based on the second wind information comprises:
   determining a difference value, obtained by subtracting the rotation angle of the cabin of the wind turbine at the current moment and the initial angle from the wind direction angle in the second wind information, as the detection angle at the current moment; and
   performing the yawing control on the wind turbine by using the detection angle at the current moment as a yawing deviation angle of the wind.

4. The method according to claim 1, wherein before acquiring the first wind information at the current moment characterized by the current operation data of the neighbor wind turbine adjacent to the wind turbine when the wind direction sensor of the wind turbine fails, the method further comprises:
   determining that the wind direction sensor of the wind turbine fails in a case that a detection angle of the wind direction sensor does not change during a successive period greater than a setting time threshold; or
   determining that the wind direction sensor of the wind turbine fails in a case that a detected wind speed of the wind turbine is greater than a setting wind speed and an output power of the wind turbine is less than a preset percent of a setting power.

5. The method according to claim 1, wherein the neighbor wind turbine is adjacent to the wind turbine and an environmental wind speed currently detected by the neighbor wind turbine is greater than a predetermined wind speed threshold.

6. The method according to claim 1, wherein before acquiring the first wind information at the current moment characterized by the current operation data of the neighbor wind turbine adjacent to the wind turbine when the wind direction sensor of the wind turbine fails, the method further comprises:
   determining that the wind direction sensor of the wind turbine fails in a case that a detection angle of the wind direction sensor does not change during a successive period greater than a setting time threshold; or determining that the wind direction sensor of the wind turbine fails in a case that a detected wind speed of the wind turbine is greater than a setting wind speed and an output power of the wind turbine is less than a preset percent of a setting power.

7. The method according to claim 2, wherein before acquiring the first wind information at the current moment characterized by the current operation data of the neighbor wind turbine adjacent to the wind turbine when the wind direction sensor of the wind turbine fails, the method further comprises:
   determining that the wind direction sensor of the wind turbine fails in a case that a detection angle of the wind direction sensor does not change during a successive period greater than a setting time threshold; or
   determining that the wind direction sensor of the wind turbine fails in a case that a detected wind speed of the wind turbine is greater than a setting wind speed and an output power of the wind turbine is less than a preset percent of a setting power.

8. The method according to claim 3, wherein before acquiring the first wind information at the current moment characterized by the current operation data of the neighbor wind turbine adjacent to the wind turbine when the wind direction sensor of the wind turbine fails, the method further comprises:

determining that the wind direction sensor of the wind turbine fails in a case that a detection angle of the wind direction sensor does not change during a successive period greater than a setting time threshold; or determining that the wind direction sensor of the wind turbine fails in a case that a detected wind speed of the wind turbine is greater than a setting wind speed and an output power of the wind turbine is less than a preset percent of a setting power.

9. The method according to claim 1, wherein the neighbor wind turbine is adjacent to the wind turbine and an environmental wind speed currently detected by the neighbor wind turbine is greater than a predetermined wind speed threshold.

10. The method according to claim 2, wherein the neighbor wind turbine is adjacent to the wind turbine and an environmental wind speed currently detected by the neighbor wind turbine is greater than a predetermined wind speed threshold.

11. The method according to claim 3, wherein the neighbor wind turbine is adjacent to the wind turbine and an environmental wind speed currently detected by the neighbor wind turbine is greater than a predetermined wind speed threshold.

12. A controller for a wind turbine, configured to:

acquire first wind information at a current moment characterized by current operation data of a neighbor wind turbine adjacent to the wind turbine when at least one of a wind direction sensor and a wind direction data uploading path of the wind turbine fails;

acquire historical operation data of the neighbor wind turbine at corresponding moments and a plurality of wind information characterized by the historical operation data of the neighbor wind turbine at the corresponding moments, wherein the first wind information and each of the plurality of wind information characterized by the historical operation data of the neighbor wind turbine at the corresponding moments both comprise information about wind speed and wind direction;

perform similarity matching on the wind information characterized by the historical operation data of the neighbor wind turbine at the corresponding moments and the first wind information, to find a third wind information from the plurality of wind information characterized by the historical operation data of the neighbor wind turbine at the corresponding moments, wherein wind speed and wind direction comprised in the third wind information are respectively most similar to wind speed and wind direction comprised in the first wind information;

determine, as a first historical moment, which moment of the corresponding moments the third wind information corresponds to;

acquire historical operation data of the wind turbine at the first historical moment;

determine wind information characterized by the historical operation data of the wind turbine at the first historical moment as a second wind information; and perform yawing control on the wind turbine based on the second wind information.

13. The controller according to claim 7, wherein the wind information comprises a wind direction and a wind speed, and a wind direction angle of the wind turbine at the current moment is a sum of an initial angle of a cabin in a case of the wind turbine being not in a yawing operation state, a rotation angle of the cabin of the wind turbine at the current moment and a detection angle of the wind direction sensor of the wind turbine at the current moment; and the controller configured to:

determine a difference value, obtained by subtracting the rotation angle of the cabin of the wind turbine at the current moment and the initial angle from the wind direction angle in the second wind information, as the detection angle at the current moment; and perform the yawing control on the wind turbine by using the detection angle at the current moment as a yawing deviation angle of the wind.

14. The controller according to claim 12, wherein the controller is further configured to determine that the wind direction sensor of the wind turbine fails in a case that a detection angle of the wind direction sensor does not change during a successive period greater than a setting time threshold; or determine that the wind direction sensor of the wind turbine fails in a case that a detected wind speed of the wind turbine is greater than a setting wind speed and an output power of the wind turbine is less than a preset percent of a setting power.

15. The controller according to claim 12, wherein the controller is a controller of the wind turbine or a wind farm controller for centrally controlling each wind turbine.

16. The controller according to claim 12, wherein the controller is configured to determine that the wind direction sensor of the wind turbine fails in a case that a detection angle of the wind direction sensor does not change during a successive period greater than a setting time threshold; or determine that the wind direction sensor of the wind turbine fails in a case that a detected wind speed of the wind turbine is greater than a setting wind speed and an output power of the wind turbine is less than a preset percent of a setting power.

17. The controller according to claim 13, wherein the controller is configured to determine that the wind direction sensor of the wind turbine fails in a case that a detection angle of the wind direction sensor does not change during a successive period greater than a setting time threshold; or determine that the wind direction sensor of the wind turbine fails in a case that a detected wind speed of the wind turbine is greater than a setting wind speed and an output power of the wind turbine is less than a preset percent of a setting power.

18. The controller according to claim 12, wherein the controller is a controller of the wind turbine or a wind farm controller for centrally controlling each wind turbine.

* * * * *